United States Patent
Guan et al.

(10) Patent No.: US 9,148,878 B2
(45) Date of Patent: Sep. 29, 2015

(54) METHOD FOR DETECTING AND SENDING CONTROL SIGNALING, USER EQUIPMENT, AND BASE STATION

(71) Applicant: Huawei Technologies Co., Ltd., Shenzhen (CN)

(72) Inventors: Lei Guan, Beijing (CN); Yongxia Lv, Beijing (CN); Xiaofeng Chen, Chengdu (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 14/148,140

(22) Filed: Jan. 6, 2014

(65) Prior Publication Data

US 2014/0119269 A1    May 1, 2014

Related U.S. Application Data

(63) Continuation of application No. PCT/CN2012/078014, filed on Jul. 2, 2012.

(30) Foreign Application Priority Data

Jul. 7, 2011 (CN) .......................... 2011 1 0189993

(51) Int. Cl.
*H04L 1/00* (2006.01)
*H04L 12/26* (2006.01)
*H04W 4/00* (2009.01)
(Continued)

(52) U.S. Cl.
CPC ........... *H04W 72/042* (2013.01); *H04B 7/0689* (2013.01); *H04L 1/0006* (2013.01); *H04L 1/0027* (2013.01); *H04L 5/0053* (2013.01);
(Continued)

(58) Field of Classification Search
None
See application file for complete search history.

(56) References Cited

U.S. PATENT DOCUMENTS 8,380,135 B2 * 2/2013 Ko et al. .................... 455/68
2011/0019776 A1   1/2011 Zhang et al.

FOREIGN PATENT DOCUMENTS

| CN | 101605375 A | 12/2009 |
|----|-------------|---------|
| CN | 101715211 A | 5/2010  |

(Continued)

OTHER PUBLICATIONS

Nortel Networks, "Control Channel Design for the Support of Wider Bandwidth for LTE-Advanced," R1-090759 TSG-RAN1 #56; Athens, Greece; Feb. 9-13, 2009. 10 pages.

(Continued)

*Primary Examiner* — Kwang B Yao
*Assistant Examiner* — Adam Duda
(74) *Attorney, Agent, or Firm* — Slater & Matsil, L.L.P.

(57) ABSTRACT

Embodiments of the present invention provide a method for detecting and sending control signaling, a user equipment, and a base station. The detecting method includes: obtaining, by a UE, a transmission mode of a data channel configured by a base station; determining, by the UE, a first DCI format and a second DCI format that are corresponding to the transmission mode, where PDCCH information corresponding to the first DCI format is transmitted in a precoding-based mode, and PDCCH information corresponding to the second DCI format is transmitted in a single-antenna port mode or transmit diversity mode based on non-precoding; and detecting, by the UE and in a subframe, PDCCH information corresponding to the first DCI format and the second DCI format according to a mode in which the PDCCH information is transmitted.

14 Claims, 5 Drawing Sheets

(51) Int. Cl.
*H04H 20/71* (2008.01)
*H04W 72/04* (2009.01)
*H04W 72/00* (2009.01)
*H04L 5/00* (2006.01)
*H04B 7/06* (2006.01)

(52) U.S. Cl.
CPC ........... *H04W 72/005* (2013.01); *H04B 7/0619* (2013.01)

(56) References Cited

FOREIGN PATENT DOCUMENTS

| CN | 101764642 A | 6/2010 |
|---|---|---|
| CN | 102076098 A1 | 5/2011 |
| WO | 2011019009 A1 | 2/2011 |

OTHER PUBLICATIONS

ZTE, "Aspects on DL Control Signaling Enhancements," R1-111521 TSG-RAN WG1 #65, Barcelona, Spain; May 9-13, 2011. 4 pages.
Research in Motion, UK Limited, "PDCCH Enhancement Considerations," R1-111661 3GPP TSG RAN WG1 Meeting#65; Barcelona, Spain, May 9-13, 2011. 4 pages.
"Chinese International Search Report," Chinese Application No. PCT/CN2012/078014, Sep. 13, 2012, 11 pages.
Panasonic, "Discussion on uplink transmission mode," 3GPP TSG RAN WG1 Meeting #62, R1-104903, Madrid, Spain, Aug. 23-27, 2010, 4 pages.

\* cited by examiner

METHOD FOR DETECTING AND SENDING CONTROL SIGNALING, USER EQUIPMENT, AND BASE STATION

This application is a continuation of International Application No. PCT/CN2012/078014, filed on Jul. 2, 2012, which claims priority to Chinese Patent Application No. 201110189993.8, filed on Jul. 7, 2011, both of which are hereby incorporated by reference in their entireties.

TECHNICAL FIELD

Embodiments of the present invention relate to communications technologies, and in particular, to a method for detecting and sending control signaling, a user equipment, and a base station.

BACKGROUND

In a long term evolution (Long Term Evolution, LTE) system, downlink control information (Downlink Control Information, DCI) is carried over a physical downlink control channel (Physical Downlink Control Channel, PDCCH), and may also be referred to as PDCCH information. Different transmission modes may correspond to PDCCH information in a variety of DCI formats. Because a capacity of a PDCCH is limited, a PDCCH based on a dedicated reference signal (Dedicated Reference Signal, DRS) (DRS-based PDCCH, D-PDCCH) is introduced to carry the PDCCH information, where the PDCCH information is transmitted in a precoding-based mode in the D-PDCCH.

The prior art does not provide how to send and detect PDCCH information that is transmitted in a precoding-based mode.

SUMMARY OF THE INVENTION

Embodiments of the present invention provide a method for detecting and sending control signaling, a user equipment, and a base station to send and detect PDCCH information that is transmitted in a precoding-based mode.

In another aspect, the present invention provides a method for detecting control signaling, including obtaining, by a UE, a transmission mode of a data channel configured by a base station, determining, by the UE, a first DCI format and a second DCI format that are corresponding to the transmission mode, where PDCCH information corresponding to the first DCI format is transmitted in a precoding-based mode, and PDCCH information corresponding to the second DCI format is transmitted in a single-antenna port mode or transmit diversity mode based on non-precoding, and detecting, by the UE and in a subframe, the PDCCH information corresponding to the first DCI format and the second DCI format according to a mode in which the PDCCH information is transmitted.

In one aspect, the present invention provides a method for sending control signaling, including configuring, by a base station, a transmission mode of a data channel, determining, by the base station, a DCI format corresponding to the transmission mode, where the DCI format is a first DCI format or a second DCI format, PDCCH information corresponding to the first DCI format is transmitted in a precoding-based mode, and PDCCH information corresponding to the second DCI format is transmitted in a single-antenna port mode or transmit diversity mode based on non-precoding, and sending, by the base station and in a subframe, the PDCCH information corresponding to the DCI format to a UE according to a mode in which the PDCCH information is transmitted.

In another aspect, the present invention provides a method for detecting control signaling, including obtaining, by a UE, a transmission mode of a data channel configured by a base station, and determining an MBSFN subframe in a radio frame, determining, by the UE, a DCI format corresponding to the transmission mode, where PDCCH information corresponding to the DCI format is transmitted in a precoding-based mode, and the DCI format corresponds only to the transmission mode, and detecting, by the UE and in the determined MBSFN subframe, the PDCCH information corresponding to the DCI format according to a mode in which the PDCCH information is transmitted.

In one aspect, the present invention provides a method for sending control signaling, including configuring, by a base station, a transmission mode of a data channel, and determining an MBSFN subframe in a radio frame, determining, by the base station, a DCI format corresponding to the transmission mode, where PDCCH information corresponding to the DCI format is transmitted in a precoding-based mode, and the DCI format corresponds only to the transmission mode, and sending, by the base station and in the determined MBSFN subframe, the PDCCH information corresponding to the DCI format to a UE according to a mode in which the PDCCH information is transmitted.

In another aspect, the present invention provides a user equipment, including an obtaining unit, adapted to obtain a transmission mode of a data channel configured by a base station, a determining unit, adapted to determine a first DCI format and a second DCI format that are corresponding to the transmission mode obtained by the obtaining unit, where PDCCH information corresponding to the first DCI format is transmitted in a precoding-based mode, and PDCCH information corresponding to the second DCI format is transmitted in a single-antenna port mode or transmit diversity mode based on non-precoding, and a detecting unit, adapted to detect, in a subframe and according to a mode in which the PDCCH information is transmitted, the PDCCH information corresponding to the first DCI format and the second DCI format that are determined by the determining unit.

In another aspect, the present invention provides a base station, including a configuring unit, adapted to configure a transmission mode of a data channel, a determining unit, adapted to determine a DCI format corresponding to the transmission mode configured by the configuring unit, where the DCI format is a first DCI format or a second DCI format, PDCCH information corresponding to the first DCI format is transmitted in a precoding-based mode, and PDCCH information corresponding to the second DCI format is transmitted in a single-antenna port mode or transmit diversity mode based on non-precoding, and a sending unit, adapted to send, in a subframe and according to a mode in which the PDCCH information is transmitted, the PDCCH information corresponding to the DCI format determined by the determining unit to a UE.

In another aspect, the present invention provides a user equipment, including an obtaining unit, adapted to obtain a transmission mode of a data channel configured by a base station, and determine an MBSFN subframe in a radio frame, a determining unit, adapted to determine a DCI format corresponding to the transmission mode obtained by the obtaining unit, where PDCCH information corresponding to the DCI format is transmitted in a precoding-based mode, and the DCI format corresponds only to the transmission mode, and a detecting unit, adapted to detect, in the MBSFN subframe determined by the obtaining unit and according to a mode in which the PDCCH information is transmitted, the PDCCH information corresponding to the DCI format determined by the determining unit.

In another aspect, the present invention provides a base station, including a configuring unit, adapted to configure a transmission mode of a data channel, and determine an MBSFN subframe in a radio frame, a determining unit, adapted to determine a DCI format corresponding to the transmission mode configured by the configuring unit, where PDCCH information corresponding to the DCI format is transmitted in a precoding-based mode, and the DCI format corresponds only to the transmission mode, and a sending unit, adapted to send, in the MBSFN subframe determined by the configuring unit and according to a mode in which the PDCCH information is transmitted, the PDCCH information corresponding to the DCI format determined by the determining unit to a UE.

According to the technical solutions described above, the embodiments of the present invention are capable of sending and detecting PDCCH information transmitted in a precoding-based mode.

BRIEF DESCRIPTION OF THE DRAWINGS

For a more complete understanding of the present invention, and the advantages thereof, reference is now made to the following descriptions taken in conjunction with the accompanying drawings, in which.

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that a D-PDCCH involved in the embodiments of the present invention may also be referred to as a PDCCH based on a user-specific reference signal, and the like, where the embodiments of the present invention set no limit thereto.

In an existing LTE system, a downlink subframe includes 14 symbols. Downlink control information such as PDCCH information is contained in first n symbols, where n may be 1, 2, 3, or 4. This region may be referred to as a control channel region. Downlink data scheduled by the PDCCH is carried in the following symbols n+1 to 14, where the region may be referred to as a data channel region.

Figure 1:
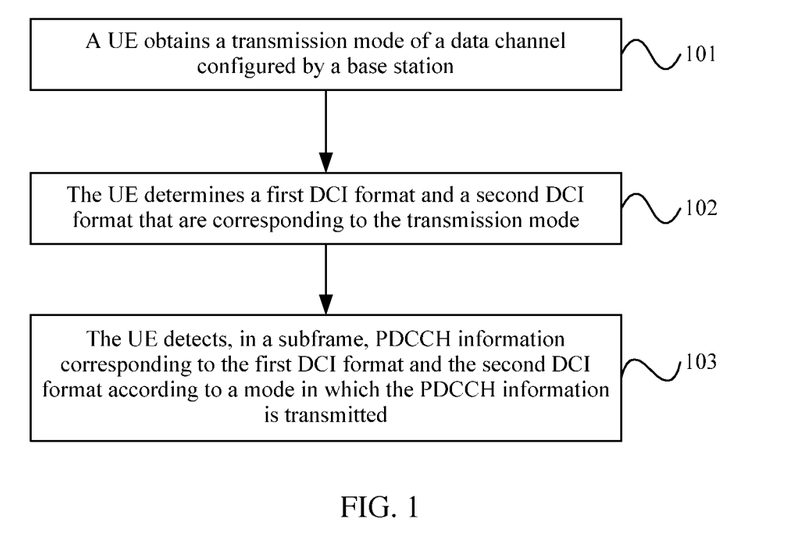
FIG. 1 is a schematic flowchart of a method for detecting control signaling according to an embodiment of the present invention.

FIG. 1 is a schematic flowchart of a method for detecting control signaling according to an embodiment of the present invention. As shown in FIG. 1, the method for detecting control signaling according to the embodiment may include the following steps:

101. A user equipment (User Equipment, UE) obtains a transmission mode of a data channel configured by a base station.

The transmission mode of the data channel may be a mode such as single-antenna port, transmit diversity, or multi-user multiple input multiple output (Multiple Input Multiple Output, MIMO). Each transmission mode corresponds to at least one DCI format. For example, the UE can obtain the transmission mode of the data channel by receiving radio resource control (Radio Resource Control, RRC) dedicated signaling sent by the base station. Table 1 and Table 2 respectively list corresponding relationships between transmission modes of a downlink data channel as well as an uplink data channel in an existing system and DCI formats.

TABLE 1

Corresponding relationships between transmission modes of a downlink data channel and DCI formats

| Transmission mode No. of downlink data channel | DCI format | Transmission mode of downlink data channel |
|---|---|---|
| Mode 1 | DCI format 1A | Single-antenna port |
|  | DCI format 1 | Single-antenna port |
| Mode 2 | DCI format 1A | Transmit diversity |
|  | DCI format 1 | Transmit diversity |
| Mode 3 | DCI format 1A | Transmit diversity |
|  | DCI format 2A | Large delay cyclic delay diversity or transmit diversity |
| Mode 4 | DCI format 1A | Transmit diversity |
|  | DCI format 2 | Closed-loop spatial multiplexing or transmit diversity |

TABLE 1-continued

Corresponding relationships between transmission modes of a downlink data channel and DCI formats

| Transmission mode No. of downlink data channel | DCI format | Transmission mode of downlink data channel |
|---|---|---|
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | Single-antenna port or transmit diversity |
| | DCI format 1 | Single-antenna port |
| Mode 8 | DCI format 1A | Single-antenna port or transmit diversity |
| | DCI format 2B | Dual-layer transmission or single-antenna port |
| Mode 9 | DCI format 1A | Single-antenna port or transmit diversity |
| | DCI format 2C | Up to 8 layer transmission |

TABLE 2

Corresponding relationships between transmission modes of an uplink data channel and DCI formats

| Transmission mode No. of uplink data channel | DCI format | Transmission mode of uplink data channel |
|---|---|---|
| Mode 1 | DCI format 0 | Single-antenna port |
| Mode 2 | DCI format 0 | Single-antenna port |
| | DCI format 4 | Closed-loop spatial multiplexing |

102. The UE determines a first DCI format and a second DCI format that are corresponding to the transmission mode.

PDCCH information corresponding to the first DCI format is transmitted in a precoding-based mode, and PDCCH information corresponding to the second DCI format is transmitted in a single-antenna port mode or transmit diversity mode based on non-precoding.

103. The UE detects, in a subframe, the PDCCH information corresponding to the first DCI format and the second DCI format according to a mode in which the PDCCH information is transmitted.

The mode in which the PDCCH information is transmitted may include transmission modes where the PDCCH information corresponding to the first DCI format is transmitted in a precoding-based mode and the PDCCH information corresponding to the second DCI format is transmitted in a single-antenna port mode or transmit diversity mode based on non-precoding.

Figure 9:
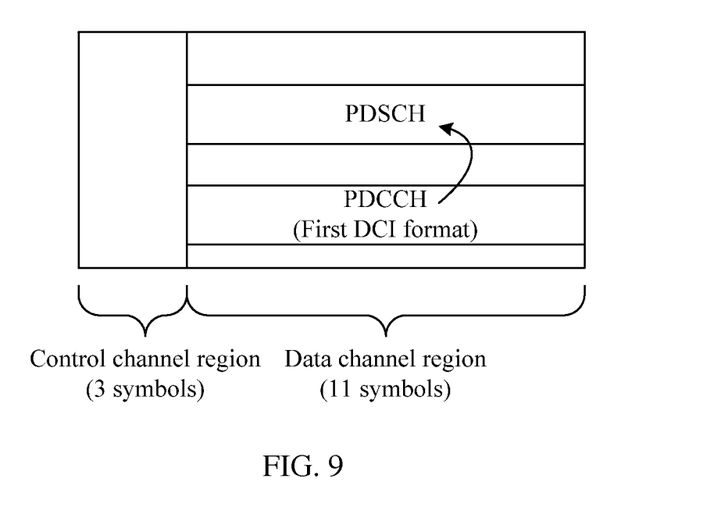
FIG. 9 is a schematic diagram illustrating that PDCCH information corresponding to a first DCI format is carried in a data channel region of the subframe in the embodiments corresponding to FIG. 1 and FIG. 2.

The PDCCH information corresponding to the first DCI format may be carried in a data channel region of the subframe, that is, be carried in a D-PDCCH, as shown in FIG. 9.

Figure 10:
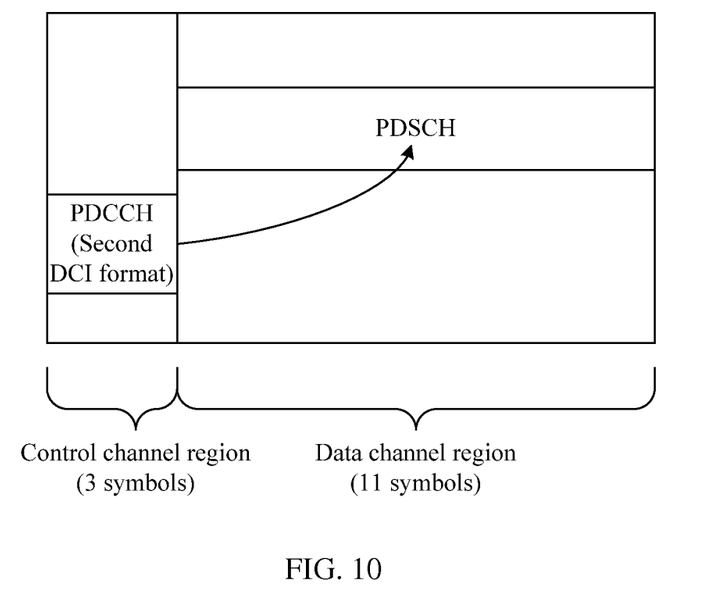
FIG. 10 is a schematic diagram illustrating that PDCCH information corresponding to a second DCI format is carried in a control channel region of the subframe in the embodiments corresponding to FIG. 1 and FIG. 2.
Figure 11:
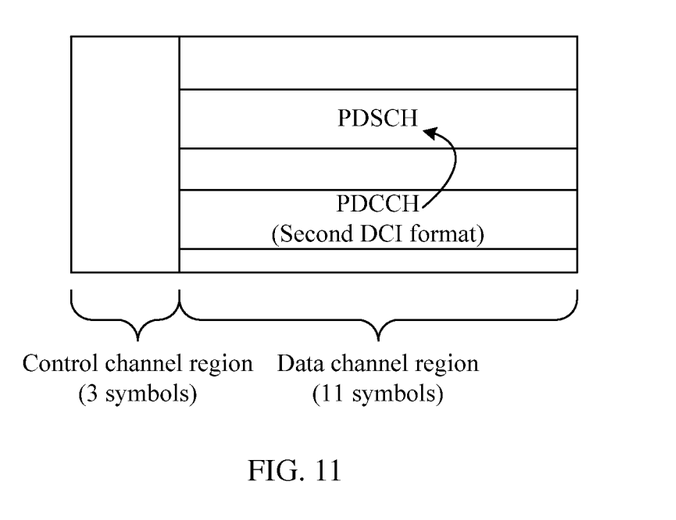
FIG. 11 is a schematic diagram illustrating that PDCCH information corresponding to a second DCI format is carried in a data channel region of the subframe in the embodiments corresponding to FIG. 1 and FIG. 2.

The PDCCH information corresponding to the second DCI format, preferentially, may be carried in a control channel region of the subframe, as shown in FIG. 10, or alternatively, may also be carried in a data channel region of the subframe, as shown in FIG. 11.

Alternatively, if a data channel scheduled by the PDCCH information corresponding to the second DCI format is on a second carrier, the PDCCH information corresponding to the second DCI format is carried in a control channel region of a first carrier. The first carrier is a backward-compatible carrier, where a CRS is transmitted thereon. The second carrier is a non-backward-compatible carrier, such as an extension carrier (extension carrier) or a carrier segment (carrier segment), where no CRS is transmitted thereon.

Specifically, when the subframe is a multicast broadcast single frequency network (Multicast Broadcast Single Frequency Network, MBSFN) subframe, if the PDCCH information corresponding to the second DCI format is carried in a control channel region of the MBSFN subframe, the UE may, in the MBSFN subframe, detect the PDCCH information corresponding to the first DCI format based on a dedicated reference signal (Dedicated Reference Signal, DRS), and detect the PDCCH information corresponding to the second DCI format based on a cell reference signal (Cell Reference Signal, CRS).

If the PDCCH information corresponding to the second DCI format is carried in a data channel region of the MBSFN subframe, the UE may, in the MBSFN subframe, detect the PDCCH information corresponding to the first DCI format based on a DRS, and detect the PDCCH information corresponding to the second DCI format based on a DRS or a truncated CRS.

Specifically, when the subframe is a non-MBSFN subframe, the UE may, in the non-MBSFN subframe, detect the PDCCH information corresponding to the first DCI format based on a DRS, and detect the PDCCH information corresponding to the second DCI format based on a DRS or a CRS.

The detecting the PDCCH information based on the DRS specifically refers to using the DRS to perform channel estimation and then detect (for example, demodulate and decode) the PDCCH information. The DRS is sent to the UE by the base station, and a position of the DRS in the subframe is predefined.

The detecting the PDCCH information based on the CRS specifically refers to using the CRS to perform channel estimation and then detect (for example, demodulate and decode) the PDCCH information. The CRS is sent to the UE by the base station, and a position of the CRS in the subframe is predefined.

The detecting the PDCCH information based on the truncated CRS specifically refers to that the data channel region of the MBSFN subframe originally has no CRS, and in order to detect the PDCCH information, the base station may send a CRS, namely, a truncated CRS, only on a time-frequency resource where the PDCCH information of the UE is located, where the truncated CRS is used to perform channel estimation and then detect (for example, demodulate and decode) the PDCCH information.

Alternatively, the first DCI format may be a DCI format corresponding to the transmission mode, for example, a DCI format 1, 2, 2A, 2C, or 4; correspondingly, the second DCI format is a DCI format shared by multiple transmission modes, for example, a DCI format 0 or 1A.

Alternatively, the first DCI format may also be a DCI format shared by multiple transmission modes, for example, a DCI format 0 or 1A; correspondingly, the second DCI format is a DCI format corresponding to the transmission mode, for example, a DCI format 1, 2, 2A, 2C, or 4.

It should be noted that before 103, the UE may further learn, by using the RRC dedicated signaling sent by the base station, that it is required to detect the PDCCH information corresponding to the first DCI format and the second DCI format, that is, the UE enters a D-PDCCH detection mode.

In this embodiment, the UE determines the first DCI format and the second DCI format that are corresponding to the transmission mode according to the transmission mode configured by the base station, so that the UE can detect, in the subframe, the PDCCH information corresponding to the first DCI format and the second DCI format, thereby detecting the PDCCH information on the D-PDCCH.

In this embodiment, if a channel state cannot be fed back accurately, for example, in a scenario where the UE moves at a high speed, the base station cannot obtain the accurate channel state, hence cannot send, in the subframe, the PDCCH information corresponding to the first DCI format in a precoding mode based on the channel state. In such cases, the base station may send, in the subframe, the PDCCH information corresponding to the second DCI format in a single-antenna port mode or transmit diversity mode based on non-precoding, where the UE detects, in the subframe, the PDCCH information corresponding to the first DCI format and the second DCI format, so that the UE can accurately detect the PDCCH information corresponding to the second DCI format, thereby further improving reliability in PDCCH information detection.

In this embodiment, if the base station notifies, by using the RRC dedicated signaling, the UE that it is required to detect the PDCCH information corresponding to the first DCI format and the second DCI format, the base station, however, before the base station receives acknowledgment information that is fed back by the UE and indicates successful receipt of the RRC signaling, cannot determine whether the UE receives the RRC dedicated signaling successfully. In such cases, the base station may send, in the subframe, the PDCCH information corresponding to the second DCI format in a single-antenna port mode or transmit diversity mode based on non-precoding, where the UE detects, in the subframe, the PDCCH information corresponding to the first DCI format and the second DCI format, so that the UE can accurately detect the PDCCH information corresponding to the second DCI format, thereby further improving reliability in PDCCH information detection and implementing smooth transition between two PDCCH detection modes.

Figure 2:
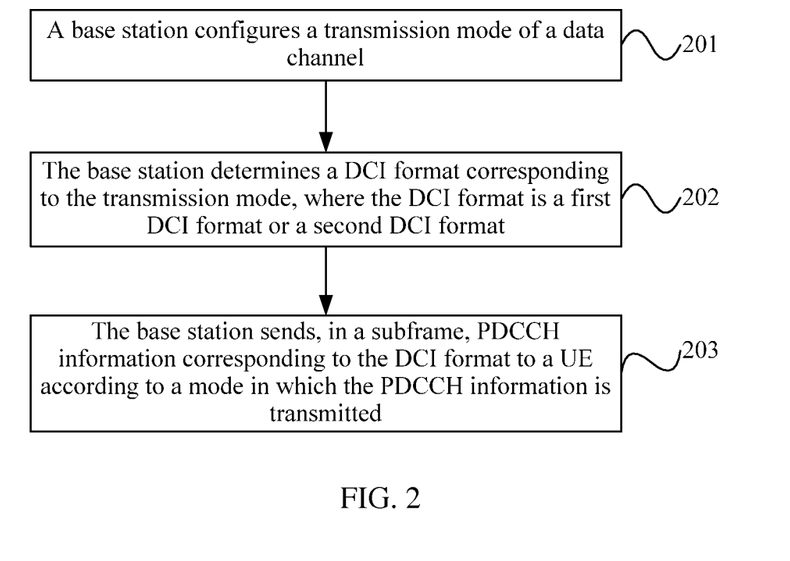
FIG. 2 is a schematic flowchart of a method for sending control signaling according to another embodiment of the present invention.

FIG. 2 is a schematic flowchart of a method for sending control signaling according to another embodiment of the present invention. As shown in FIG. 2, the method for sending control signaling according to the embodiment may include the following steps:

201. A base station configures a transmission mode of a data channel.

The related content in the embodiment corresponding to FIG. 1 may be referenced for the detailed description of the transmission mode of the data channel.

202. The base station determines a DCI format corresponding to the transmission mode, where the DCI format is a first DCI format or a second DCI format.

PDCCH information corresponding to the first DCI format is transmitted in a precoding-based mode, and PDCCH information corresponding to the second DCI format is transmitted in a single-antenna port mode or transmit diversity mode based on non-precoding.

203. The base station sends, in a subframe, PDCCH information corresponding to the DCI format to a UE according to a mode in which the PDCCH information is transmitted.

The mode in which the PDCCH information is transmitted may include transmission modes where the PDCCH information corresponding to the first DCI format is transmitted in a precoding-based mode and the PDCCH information corresponding to the second DCI format is transmitted in a single-antenna port mode or transmit diversity mode based on non-precoding.

The PDCCH information corresponding to the first DCI format may be carried in a data channel region of the subframe, that is, be carried in a D-PDCCH, as shown in FIG. 9.

The PDCCH information corresponding to the second DCI format, preferentially, may be carried in a control channel region of the subframe, as shown in FIG. 10, or alternatively, may also be carried in a data channel region of the subframe, as shown in FIG. 11.

Alternatively, if a data channel scheduled by the PDCCH information corresponding to the second DCI format is on a second carrier, the PDCCH information corresponding to the second DCI format is carried in a control channel region of a first carrier. The first carrier is a backward-compatible carrier, where a CRS is transmitted thereon. The second carrier is a non-backward-compatible carrier, such as an extension carrier (extension carrier) or a carrier segment (carrier segment), where no CRS is transmitted thereon.

Alternatively, the first DCI format may be a DCI format corresponding to the transmission mode, for example, a DCI format 1, 2, 2A, 2C, or 4; correspondingly, the second DCI format is a DCI format shared by multiple transmission modes, for example, a DCI format 0 or 1A.

Alternatively, the first DCI format may also be a DCI format shared by multiple transmission modes, for example, a DCI format 0 or 1A; correspondingly, the second DCI format is a DCI format corresponding to the transmission mode, for example, a DCI format 1, 2, 2A, 2C, or 4.

It should be noted that, before 203, the base station may further instruct, by sending RRC dedicated signaling to the UE, the UE to detect the PDCCH information corresponding to the DCI format, that is, enable the UE to enter a D-PDCCH detection mode.

In this embodiment, the base station determines the DCI format corresponding to the transmission mode according to the configured transmission mode, and sends, in the subframe, the PDCCH information corresponding to the determined DCI format, so that the UE can detect, in the subframe, the PDCCH information corresponding to the first DCI format and the second DCI format, thereby sending the PDCCH information on the D-PDCCH.

In this embodiment, if a channel state cannot be fed back accurately, for example, in a scenario where the UE moves at a high speed, the base station cannot obtain the accurate channel state, hence cannot send, in the subframe, the PDCCH information corresponding to the first DCI format in a precoding mode based on the channel state. In such cases, the base station may send, in the subframe, the PDCCH information corresponding to the second DCI format in a single-antenna port mode or transmit diversity mode based on non-precoding, thereby further improving reliability in sending the PDCCH information.

In this embodiment, if the base station notifies, by using the RRC dedicated signaling, the UE that it is required to detect the PDCCH information corresponding to the first DCI format and the second DCI format, the base station, however, before the base station receives acknowledgment information that is fed back by the UE and indicates successful receipt of the RRC signaling, cannot determine whether the UE receives the RRC dedicated signaling successfully. In such cases, the base station may send, in the subframe, the PDCCH information corresponding to the second DCI format in a single-antenna port mode or transmit diversity mode based on non-precoding, thereby further improving reliability in sending the PDCCH information and implementing smooth transition between two PDCCH detection modes.

Figure 3:
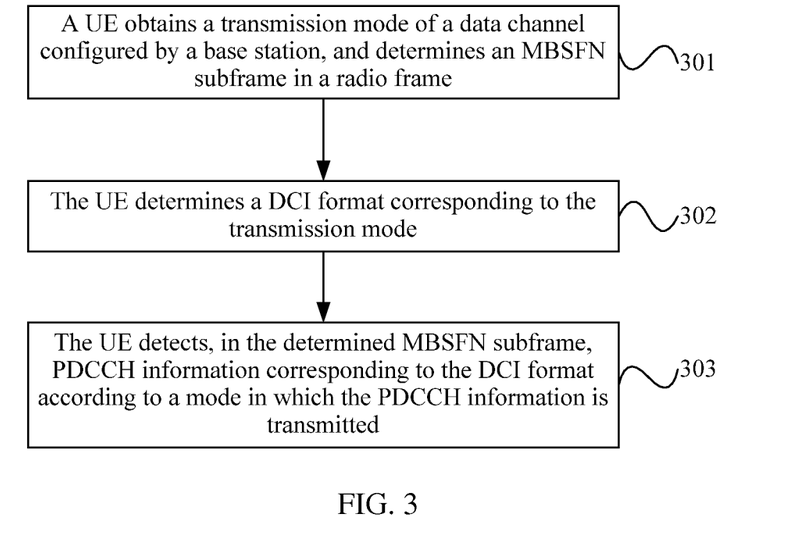
FIG. 3 is a schematic flowchart of a method for detecting control signaling according to another embodiment of the present invention.

FIG. 3 is a schematic flowchart of a method for detecting control signaling according to another embodiment of the present invention. As shown in FIG. 3, the method for detecting control signaling according to the embodiment may include the following steps:

301. A UE obtains a transmission mode of a data channel configured by a base station, and determines an MBSFN subframe in a radio frame.

The related content in the embodiment corresponding to FIG. 1 may be referenced for the detailed description of the transmission mode of the data channel.

It should be noted that no execution sequence is specified for the UE to obtain the transmission mode of the data channel configured by the base station and for the UE to determine the MBSFN subframe in the radio frame, and this embodiment sets no limit thereto.

302. The UE determines a DCI format corresponding to the transmission mode.

PDCCH information corresponding to the DCI format is transmitted in a precoding-based mode, and the DCI format corresponds only to the transmission mode.

303. The UE detects, in the determined MBSFN subframe, PDCCH information corresponding to the DCI format according to a mode in which the PDCCH information is transmitted.

The mode in which the PDCCH information is transmitted may be a transmission mode where the PDCCH information corresponding to the DCI format is transmitted in a precoding-based mode.

The PDCCH information corresponding to the DCI format may be carried in a data channel region of the MBSFN subframe, as shown in FIG. 9.

Specifically, the UE may specifically detect, in the MBSFN subframe, the PDCCH information corresponding to the DCI format based on a DRS.

The DCI format corresponds only to the transmission mode, which means that the DCI format is not a DCI format or fallback DCI format shared by multiple transmission modes, for example, DCI formats 0 and 1A. Because the data channel region of the MBSFN subframe has no CRS, only one DCI format for demodulation based on a DRS and corresponding only to the transmission mode is reserved, which simplifies a system design. If a channel condition degrades, it is allowed not to perform D-PDCCH scheduling on the subframe, but to perform D-PDCCH scheduling on a non-MBSFN subframe.

Specifically, the DCI format may be a DCI format corresponding to the transmission mode, for example, a DCI format 1, 2, 2A, 2C, or 4.

It should be noted that, before 303, the UE may further learn, by using RRC dedicated signaling sent by the base station, that it is required to detect the PDCCH information corresponding to the DCI format, that is, the UE enters a D-PDCCH detection mode.

In this embodiment, the UE determines the DCI format corresponding to the transmission mode according to the transmission mode configured by the base station, so that the UE can detect, in the determined MBSFN subframe, the PDCCH information corresponding to the DCI format, thereby detecting the PDCCH information on the D-PDCCH.

Figure 4:
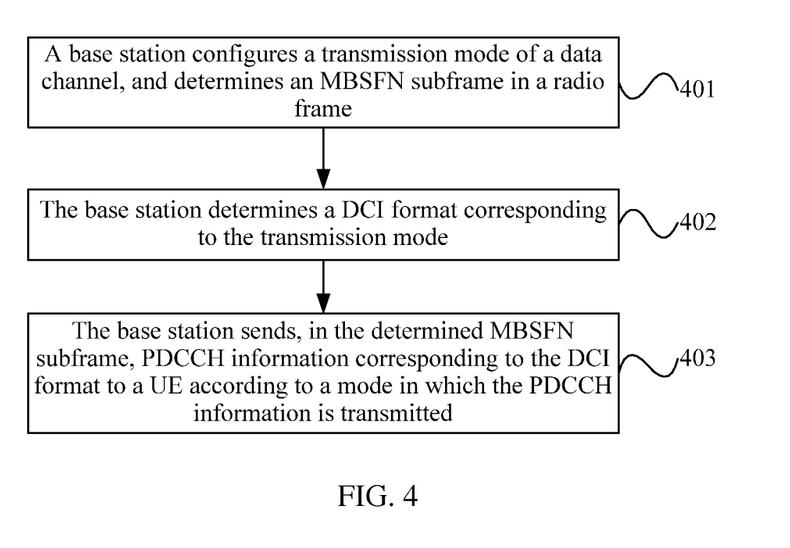
FIG. 4 is a schematic flowchart of a method for sending control signaling according to another embodiment of the present invention.

FIG. 4 is a schematic flowchart of a method for sending control signaling according to another embodiment of the present invention. As shown in FIG. 4, the method for sending control signaling according to the embodiment may include the following steps:

401. A base station configures a transmission mode of a data channel, and determines an MBSFN subframe in a radio frame.

The related content in the embodiment corresponding to FIG. 1 may be referenced for the detailed description of the transmission mode of the data channel.

402. The base station determines a DCI format corresponding to the transmission mode.

PDCCH information corresponding to the DCI format is transmitted in a precoding-based mode, and the DCI format corresponds only to the transmission mode.

403. The base station sends, in the determined MBSFN subframe, the PDCCH information corresponding to the DCI format to a UE according to a mode in which the PDCCH information is transmitted.

The mode in which the PDCCH information is transmitted may be a transmission mode where the PDCCH information corresponding to the DCI format is transmitted in a precoding-based mode.

The PDCCH information corresponding to the DCI format may be carried in a data channel region of the MBSFN subframe, as shown in FIG. 9.

The DCI format corresponds only to the transmission mode, which means that the DCI format is not a DCI format or fallback DCI format shared by multiple transmission modes, for example, DCI formats 0 and 1A. Because the data channel region of the MBSFN subframe has no CRS, only one DCI format for demodulation based on a DRS and corresponding only to the transmission mode is reserved, which simplifies a system design. If a channel condition degrades, it is allowed not to perform D-PDCCH scheduling on the subframe, but to perform D-PDCCH scheduling on a non-MBSFN subframe.

Specifically, the DCI format may be a DCI format corresponding to the transmission mode, for example, a DCI format 1, 2, 2A, 2C, or 4.

It should be noted that, before 403, the base station may further instruct, by sending RRC dedicated signaling to the UE, the UE to detect the PDCCH information corresponding to the DCI format, that is, enable the UE to enter a D-PDCCH detection mode.

In this embodiment, the base station determines the DCI format corresponding to the transmission mode according to the configured transmission mode, and sends, in the determined MBSFN subframe, the PDCCH information corresponding to the DCI format, so that the UE can detect, in the determined MBSFN subframe, the PDCCH information corresponding to the DCI format, thereby detecting the PDCCH information on the D-PDCCH.

Another embodiment of the present invention provides a method for detecting control signaling, which may include the following steps:

A UE obtains a transmission mode of a data channel configured by a base station, where the data channel is transmitted over a non-backward-compatible carrier.

The related content in the embodiment corresponding to FIG. 1 may be referenced for the detailed description of the transmission mode of the data channel.

The UE determines a DCI format corresponding to the transmission mode.

PDCCH information corresponding to the DCI format is transmitted in a precoding-based mode, and the DCI format corresponds only to the transmission mode.

The UE detects the PDCCH information corresponding to the DCI format according to a mode in which the PDCCH information is transmitted, and receives data channel information on the non-backward-compatible carrier according to the detected PDCCH information.

The non-backward-compatible carrier is an extension carrier (extension carrier) or a carrier segment (carrier segment), and no CRS is transmitted thereon.

Another embodiment of the present invention provides a method for sending control signaling, which may include the following steps:

A base station configures a transmission mode of a data channel, where the data channel is transmitted over a non-backward-compatible carrier.

The base station determines a DCI format corresponding to the transmission mode.

PDCCH information corresponding to the DCI format is transmitted in a precoding-based mode, and the DCI format corresponds only to the transmission mode.

The base station sends the PDCCH information corresponding to the DCI format to a UE according a mode in which the PDCCH information is transmitted, so that the UE receives data channel information on the non-backward-compatible carrier according to the PDCCH information sent by the base station.

The non-backward-compatible carrier is an extension carrier (extension carrier) or a carrier segment (carrier segment), and no CRS is transmitted thereon.

The technical solutions of the present invention may be applied to a communication system, such as an LTE system. The base station herein may be an evolved node B (Evolved Node B, eNB) in the LTE system.

It should be noted that, for the purpose of brief description, the above method embodiments are described as a combination of a series of actions; however, persons skilled in the art should understand that the present invention is not limited by the sequence of the actions described because some steps may be performed in other sequences or simultaneously according to the present invention. In addition, persons skilled in the art should also understand that the embodiments described in the specification are preferred embodiments, and the actions and modules involved therein are not necessarily required for the present invention.

In the above embodiments, the embodiments emphasize different aspects, and the part not described in detail in one embodiment may be referred to relevant description of other embodiments.

Figure 5:
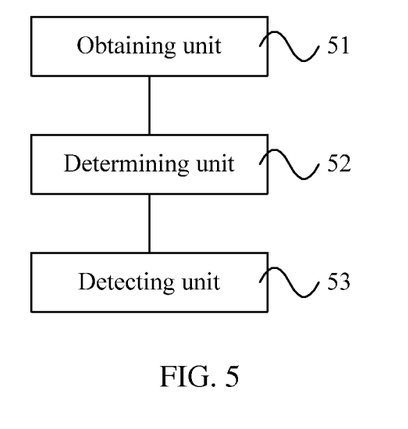
FIG. 5 is a schematic structural diagram of a user equipment according to another embodiment of the present invention.

FIG. 5 is a schematic structural diagram of a user equipment according to another embodiment of the present invention. As shown in FIG. 5, a user equipment according to the embodiment may include an obtaining unit 51, a determining unit 52, and a detecting unit 53. The obtaining unit 51 is adapted to obtain a transmission mode of a data channel configured by a base station; the determining unit 52 is adapted to determine a first DCI format and a second DCI format that are corresponding to the transmission mode obtained by the obtaining unit 51, where PDCCH information corresponding to the first DCI format is transmitted in a precoding-based mode, and PDCCH information corresponding to the second DCI format is transmitted in a single-antenna port mode or transmit diversity mode based on non-precoding; and the detecting unit 53 is adapted to detect, in a subframe and according to a mode in which PDCCH information is transmitted, PDCCH information corresponding to the first DCI format and the second DCI format that are determined by the determining unit 52.

Functions of the UE in the embodiment corresponding to FIG. 1 may be implemented by the user equipment provided in this embodiment.

Specifically, when the subframe is an MBSFN subframe, if the PDCCH information corresponding to the second DCI format is carried in a control channel region of the MBSFN subframe, the detecting unit 53 in this embodiment may specifically, in the MBSFN subframe, detect the PDCCH information corresponding to the first DCI format based on a DRS and detect the PDCCH information corresponding to the second DCI format based on a CRS; and if the PDCCH information corresponding to the second DCI format is carried in a data channel region of the MBSFN subframe, the detecting unit 53 in this embodiment may specifically, in the MBSFN subframe, detect the PDCCH information corresponding to the first DCI format based on a DRS and detect the PDCCH information corresponding to the second DCI format based on a DRS or a truncated CRS.

Specifically, when the subframe is a non-MBSFN subframe, the detecting unit 53 in this embodiment may specifically, in the non-MBSFN subframe, detect the PDCCH information corresponding to the first DCI format based on a DRS, and detect the PDCCH information corresponding to the second DCI format based on a DRS or a CRS.

Further, the detecting unit 53 in this embodiment may further learn, by using RRC dedicated signaling sent by the base station, that it is required to detect the PDCCH information corresponding to the first DCI format and the second DCI format that are determined by the determining unit 52.

In this embodiment, the user equipment determines, according to the transmission mode obtained by the obtaining unit, the first DCI format and the second DCI format that are corresponding to the transmission mode by using the determining unit, so that the detecting unit can detect, in the subframe, the PDCCH information corresponding to the first DCI format and the second DCI format, thereby detecting the PDCCH information on the D-PDCCH.

Figure 6:
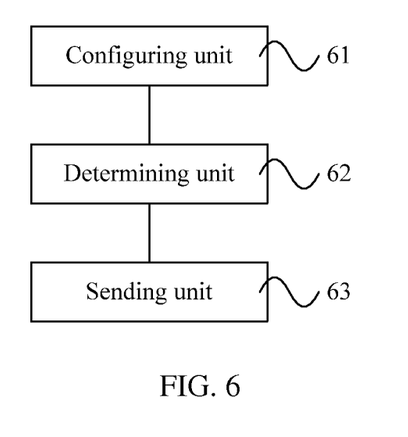
FIG. 6 is a schematic structural diagram of a base station according to another embodiment of the present invention.

FIG. 6 is a schematic structural diagram of a base station according to another embodiment of the present invention. As shown in FIG. 6, a base station according to the embodiment may include a configuring unit 61, a determining unit 62, and a sending unit 63. The configuring unit 61 is adapted to configure a transmission mode of a data channel; the determining unit 62 is adapted to determine a DCI format corresponding to the transmission mode configured by the configuring unit 61, where the DCI format is a first DCI format or a second DCI format, and PDCCH information corresponding to the first DCI format is transmitted in a precoding-based mode, and PDCCH information corresponding to the second DCI format is transmitted in a single-antenna port mode or transmit diversity mode based on non-precoding; and the sending unit 63 is adapted to send, in a subframe and according to a mode in which the PDCCH information is transmitted, PDCCH information corresponding to the DCI format determined by the determining unit 62 to a UE.

Functions of the base station in the embodiment corresponding to FIG. 2 may be implemented by the base station provided in this embodiment.

Further, the sending unit 63 in this embodiment may further instruct, by sending RRC dedicated signaling to the UE, the UE to detect the PDCCH information corresponding to the first DCI format and the second DCI format.

In this embodiment, the base station determines, according to the transmission mode configured by the configuring unit, the DCI format corresponding to the transmission mode by using the determining unit, and sends, in the subframe and by using the sending unit, the PDCCH information corresponding to the DCI format determined by the determining unit, so that the UE can detect, in the subframe, the PDCCH information corresponding to the first DCI format and the second DCI format, thereby sending the PDCCH information on the D-PDCCH.

Figure 7:
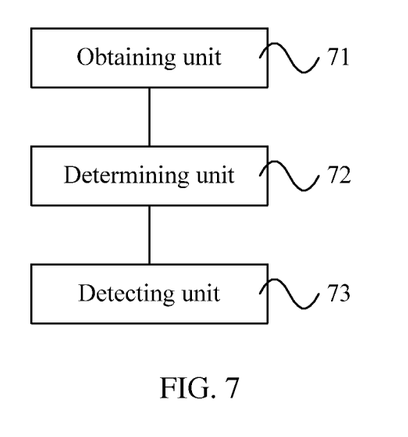
FIG. 7 is a schematic structural diagram of a user equipment according to another embodiment of the present invention.

FIG. 7 is a schematic structural diagram of a user equipment according to another embodiment of the present invention. As shown in FIG. 7, a user equipment according to the embodiment may include an obtaining unit 71, a determining unit 72, and a detecting unit 73. The obtaining unit 71 is adapted to obtain a transmission mode of a data channel configured by a base station, and determine an MBSFN subframe in a radio frame; the determining unit 72 is adapted to determine a DCI format corresponding to the transmission mode obtained by the obtaining unit 71, where PDCCH information corresponding to the DCI format is transmitted in a precoding-based mode, and the DCI format corresponds only to the transmission mode; and the detecting unit 73 is adapted to detect, in the MBSFN subframe determined by the obtaining unit 71 and according to a mode in which the PDCCH information is transmitted, the PDCCH information corresponding to the DCI format determined by the determining unit 72.

Functions of the UE in the embodiment corresponding to FIG. 3 may be implemented by the user equipment provided in this embodiment.

Further, the detecting unit 73 in this embodiment may further learn, by using RRC dedicated signaling sent by the base station, that it is required to detect the PDCCH information corresponding to the DCI format determined by the determining unit.

In this embodiment, the user equipment determines, according to the transmission mode obtained by the obtaining unit, the DCI format corresponding to the transmission mode by using the determining unit, so that the detecting unit can detect, in the MBSFN subframe determined by the obtaining unit, the PDCCH information corresponding to the DCI format, thereby detecting the PDCCH information on the D-PDCCH.

Figure 8:
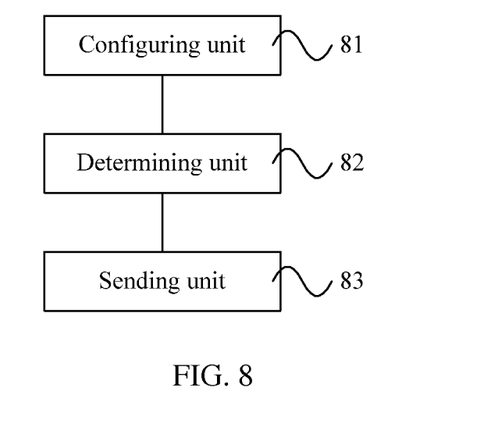
FIG. 8 is a schematic structural diagram of a base station according to another embodiment of the present invention.

FIG. 8 is a schematic structural diagram of a base station according to another embodiment of the present invention. As shown in FIG. 8, a base station according to the embodiment may include a configuring unit 81, a determining unit 82, and a sending unit 83. The configuring unit 81 is adapted to configure a transmission mode of a data channel, and determine an MBSFN subframe in a radio frame; the determining unit 82 is adapted to determine a DCI format corresponding to the transmission mode configured by the configuring unit 81, where PDCCH information corresponding to the DCI format is transmitted in a precoding-based mode, and the DCI format corresponds only to the transmission mode; and the sending unit 83 is adapted to send, in the MBSFN subframe determined by the configuring unit 81 and according to a mode in which the PDCCH information is transmitted, the PDCCH information corresponding to the DCI format determined by the determining unit 82 to a UE.

Functions of the base station in the embodiment corresponding to FIG. 4 may be implemented by the base station provided in this embodiment.

Further, the sending unit 83 in this embodiment may further instruct, by sending RRC dedicated signaling to the UE, the UE to detect the PDCCH information corresponding to the DCI format.

In this embodiment, the base station determines, according to the transmission mode configured by the configuring unit, the DCI format corresponding to the transmission mode by using the determining unit, and sends by using the sending unit, in the MBSFN subframe determined by the configuring unit, the PDCCH information corresponding to the DCI format determined by the determining unit, so that the UE can detect, in the MBSFN subframe, the PDCCH information corresponding to the DCI format, thereby detecting the PDCCH information on the D-PDCCH.

It may be clearly understood by a person skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for detecting control signaling, comprising:
obtaining, by a user equipment (UE), a transmission mode of a data channel configured by a base station;
determining, by the UE, a first downlink control information (DCI) format and a second DCI format that are corresponding to the transmission mode, wherein physical downlink control channel (PDCCH) information corresponding to the first DCI format is transmitted in a precoding-based mode, and PDCCH information corresponding to the second DCI format is transmitted in a single-antenna port mode or transmit diversity mode based on non-precoding; and
detecting, by the UE and in a subframe, the PDCCH information corresponding to the first DCI format and the second DCI format according to a mode in which the PDCCH information is transmitted.

2. The method according to claim 1, wherein:
the PDCCH information corresponding to the first DCI format is carried in a data channel region of the subframe; and
the PDCCH information corresponding to the second DCI format is carried in a control channel region or the data channel region of the subframe.

3. The method according to claim 1, wherein the subframe is a multicast broadcast single frequency network (MBSFN) subframe, and the detecting, by the UE and in the subframe, the PDCCH information corresponding to the first DCI format and the second DCI format according to the mode in which the PDCCH information is transmitted comprises:
when the PDCCH information corresponding to the second DCI format is carried in a control channel region of the MBSFN subframe, detecting, by the UE and in the MBSFN subframe, the PDCCH information corresponding to the first DCI format based on a dedicated reference signal (DRS), and detecting the PDCCH information corresponding to the second DCI format based on a cell reference signal (CRS); and
when the PDCCH information corresponding to the second DCI format is carried in a data channel region of the MBSFN subframe, detecting, by the UE and in the MBSFN subframe, the PDCCH information corresponding to the first DCI format based on the DRS, and detecting the PDCCH information corresponding to the second DCI format based on the DRS or a truncated CRS.

4. The method according to claim 1, wherein the subframe is a non-MBSFN subframe, and the detecting, by the UE and in the subframe, the PDCCH information corresponding to the first DCI format and the second DCI format according to the mode in which the PDCCH information is transmitted comprises:
detecting, by the UE and in the non-MBSFN subframe, the PDCCH information corresponding to the first DCI format based on a DRS, and detecting the PDCCH information corresponding to the second DCI format based on the DRS or a CRS.

5. The method according to claim 1, wherein before the detecting, by the UE and in the subframe, the PDCCH information corresponding to the first DCI format and the second DCI format according to the mode in which the PDCCH information is transmitted, the method further comprises:
learning, by the UE by using radio resource control (RRC) dedicated signaling sent by the base station, that it is required to detect the PDCCH information corresponding to the first DCI format and the second DCI format.

6. A user equipment, comprising:
an obtaining unit, adapted to obtain a transmission mode of a data channel configured by a base station;
a determining unit, adapted to determine a first downlink control information (DCI) format and a second DCI format that are corresponding to the transmission mode obtained by the obtaining unit, wherein physical downlink control channel (PDCCH) information corresponding to the first DCI format is transmitted in a precoding-based mode, and PDCCH information corresponding to the second DCI format is transmitted in a single-antenna port mode or transmit diversity mode based on non-precoding; and
a detecting unit, adapted to detect, in a subframe and according to a mode in which the PDCCH information is transmitted, the PDCCH information corresponding to the first DCI format and the second DCI format that are determined by the determining unit.

7. The user equipment according to claim 6, wherein the subframe is a multicast broadcast single frequency network (MBSFN) subframe, and the detecting unit is specifically adapted to when the PDCCH information corresponding to the second DCI format is carried in a control channel region of the MBSFN subframe, detect, in the MBSFN subframe, the PDCCH information corresponding to the first DCI format based on a dedicated reference signal (DRS), and detect the PDCCH information corresponding to the second DCI format based on a cell reference signal (CRS); and
when the PDCCH information corresponding to the second DCI format is carried in a data channel region of the MBSFN subframe, detect, in the MBSFN subframe, the PDCCH information corresponding to the first DCI format based on the DRS, and detect the PDCCH information corresponding to the second DCI format based on the DRS or a truncated CRS.

8. The user equipment according to claim 6, wherein the subframe is a non-MBSFN subframe, and the detecting unit is specifically adapted to in the non-MBSFN subframe, detect the PDCCH information corresponding to the first DCI format based on a DRS, and detect the PDCCH information corresponding to the second DCI format based on the DRS or a CRS.

9. The user equipment according to claim 6, wherein the detecting unit is further adapted to learn, by using radio resource control (RRC) dedicated signaling sent by the base station, that it is required to detect the PDCCH information corresponding to the first DCI format and the second DCI format that are determined by the determining unit.

10. A method for sending control signaling, comprising:
configuring, by a base station, a transmission mode of a data channel;
determining, by the base station, a downlink control information (DCI) format corresponding to the transmission mode, wherein the DCI format is a first DCI format or a second DCI format, physical downlink control channel (PDCCH) information corresponding to the first DCI format is transmitted in a precoding-based mode, and PDCCH information corresponding to the second DCI format is transmitted in a single-antenna port mode or transmit diversity mode based on non-precoding; and
sending, by the base station and in a subframe, the PDCCH information corresponding to the DCI format to a user equipment (UE) according to a mode in which the PDCCH information is transmitted.

11. The method according to claim 10, wherein:
the PDCCH information corresponding to the first DCI format is carried in a data channel region of the subframe; and the PDCCH information corresponding to the second DCI format is carried in a control channel region or the data channel region of the subframe.

12. The method according to claim 10, wherein before the sending, by the base station and in the subframe, the PDCCH information corresponding to the DCI format according to the mode in which the PDCCH information is transmitted, the method further comprises:

instructing, by the base station by sending radio resource control (RRC) dedicated signaling to the UE, the UE to detect the PDCCH information corresponding to the first DCI format and the second DCI format.

13. A base station, comprising:
a configuring unit, adapted to configure a transmission mode of a data channel;
a determining unit, adapted to determine a downlink control information (DCI) format corresponding to the transmission mode configured by the configuring unit, wherein the DCI format is a first DCI format or a second DCI format, physical downlink control channel (PDCCH) information corresponding to the first DCI format is transmitted in a precoding-based mode, and PDCCH information corresponding to the second DCI format is transmitted in a single-antenna port mode or transmit diversity mode based on non-precoding; and
a sending unit, adapted to send, in a subframe and according to a mode in which the PDCCH information is transmitted, the PDCCH information corresponding to the DCI format determined by the determining unit to a user equipment (UE).

14. The base station according to claim 13, wherein the sending unit is further adapted to instruct, by sending radio resource control (RRC) dedicated signaling to the UE, the UE to detect the PDCCH information corresponding to the first DCI format and the second DCI format.

* * * * *